W. J. COLLINS.
SAUSAGE TWISTING AND LINKING MACHINE.
APPLICATION FILED MAR. 3, 1908.

938,215.

Patented Oct. 26, 1909.
7 SHEETS—SHEET 1.

Fig. 1

WITNESSES
J. A. Brophy
John K. Braithwogel

INVENTOR
William J. Collins
BY Munn & Co.
ATTORNEYS

W. J. COLLINS.
SAUSAGE TWISTING AND LINKING MACHINE.
APPLICATION FILED MAR. 3, 1908.

938,215.

Patented Oct. 26, 1909.
7 SHEETS—SHEET 4.

WITNESSES

INVENTOR
William J. Collins
BY
ATTORNEYS

W. J. COLLINS.
SAUSAGE TWISTING AND LINKING MACHINE.
APPLICATION FILED MAR. 3, 1908.

938,215.

Patented Oct. 26, 1909.
7 SHEETS—SHEET 5.

WITNESSES
J. A. Boophy
John K. Brackinoged

INVENTOR
William J. Collins
BY Munn & Co
ATTORNEYS

UNITED STATES PATENT OFFICE.

WILLIAM JOSEPH COLLINS, OF NEW YORK, N. Y., ASSIGNOR OF ONE-HALF TO DAVID H. CROWN, OF NEW YORK, N. Y.

SAUSAGE TWISTING AND LINKING MACHINE.

938,215.

Specification of Letters Patent. Patented Oct. 26, 1909.

Application filed March 3, 1908. Serial No. 418,923.

*To all whom it may concern:*

Be it known that I, WILLIAM J. COLLINS, a citizen of the United States, and a resident of the city of New York, borough of Brooklyn, in the county of Kings and State of New York, have invented a new and Improved Sausage Twisting and Linking Machine, of which the following is a full, clear, and exact description.

This invention relates to sausage twisting and linking machines, and more particularly to machines of this class in which the filled sausage casing is gripped at separated points, in which the section between the gripped points is twisted to form a sausage link, and in which the mechanism is then released to permit the filled casing to be advanced through the machine so that an adjacent section can be gripped and twisted, suitable mechanism being included for intermittently advancing the filled casing.

An object of the invention is to provide a simple, and efficient sausage twisting and linking machine which is inexpensive to manufacture, which can be driven from any suitable source of power, which is positive and rapid in operation and which forms sausage links of uniform length.

A further object of the invention is to provide a machine of the class described, which can be adjusted so that the filled sausage casing can be formed into links of sausages of different lengths, which operates upon the filled casing without danger of tearing or otherwise injuring the same, and which twists the casing so tightly that it cannot subsequently untwist.

A still further object of the invention, is to provide a machine of the class described in which the filled sausage casing is gripped at separated points, and is twisted between these points, and in which the mechanism is so arranged that the sausage casing is gripped or otherwise engaged at the twisted point only, whereby is obviated the danger of tearing the casing or deforming the sausage links.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Before proceeding to a more detailed explanation of my invention, it should be understood that the same is particularly useful for twisting and linking sausages and the like, that is, forming the filled sausage casing into individual sausages or links of any desired length. In the manufacture of sausages, the sausage casing, which consists usually of animal intestines, is filled or stuffed with sausage meat by hand or by a suitable mechanism, and thus is formed a sausage or cartridge of considerable length. This is divided into sausages or links, by constricting it at separated points. The construction is usually effected by tying or twisting, the latter method being preferable as it can be carried out more rapidly and easily than the former. My machine receives the filled or stuffed casing from the stuffing machine or after some intermediate operation. The casing is gripped at separated points, the distance between which can be adjusted to permit the forming of links of various lengths, and the section intermediate the gripped points, is twisted by means of rotatable gripping mechanism which seizes the casing at points adjacent to the gripped points, which are held fixed. As soon as the section intermediate the gripped points has been twisted sufficiently to form a link, the gripping and twisting mechanism is automatically released and the filled casing is seized by a pair of blades or arms which advance the casing by drawing it through the released gripping and twisting mechanism, until a point is reached such that a section of the casing adapted to be twisted into a second link is arranged between the gripping and twisting means. These then become operative and the advancing mechanism returns to its original position and again seizes the casing when the second link has been formed, whereupon the casing is again advanced when the gripping and twisting mechanism has been released. These operations are repeated until the entire stuffed casing has been formed into links of the desired length. The operation of my machine is automatic. Preferably it is power driven, although if necessary, means can be provided for its manual operation. The gripping and twisting means consist of a pair of holding members which are brought together to engage the casing and separated to release it. The pairs of separated twisting members are arranged intermediate of the pair of gripping members and are each adjacent to one of the latter pairs. Consequently, the casing is rigidly held and at the same time twisted at points which lie closely adjacent. The pairs of gripping and twisting points are separated a distance corresponding to the length of the sausage link. By suitably adjusting the mechanism, the distance between these points can be regulated to permit the forming of the filled casing into links of various lengths.

Referring more particularly to the drawings, I provide a suitable machine base 1, carried upon legs or supports 2; these may be of any suitable form and may be fashioned to be secured to the floor. The base carries a projecting shelf 3 formed integral therewith and upwardly offset. Integral with the shelf 3 is an upright 4, provided with strengthening flanges 5. The upright 4 has an integral head 6 which at one side is laterally extended to project beyond the upright, for a purpose which will appear hereinafter.

The base 1 has a side wall 7 upon which is mounted a bearing 8. At the opposite side of the base is a bearing 9 corresponding to the bearing 8. A driving shaft 10 is journaled in the bearings 8 and 9 and has a flywheel 11, and loose upon the shaft a driving pulley 12. A clutch 13 is arranged upon the shaft to coöperate with the pulley to secure the same to the shaft. The clutch has an operating link 14 secured intermediate the ends of a pedal lever 15. The latter is pivoted at one of the legs 2 of the base and has an end formed into a pedal 16 by means of which it can be operated to control the clutch. A leg 2 adjacent to the pedal lever has a bracket 17 by means of which the pedal lever can be held in an operative and an inoperative position. A pinion 18 is keyed or otherwise rigidly mounted upon the shaft 10 and is in mesh with a gear-wheel 19 carried by a spindle 20 journaled in a bearing 21 formed in the wall 7. The face of the gear wheel 19, which is of the disk type, adjacent to the wall 7 has formed therein a cam groove 22 engaged by a stud 23 provided at the end of a rod 24 slidably mounted in guide brackets 25 bolted or otherwise secured to the side walls 7 and the shelf 3. The rod 24 serves a purpose which will appear hereinafter.

At the outside of the gear wheel 19 is provided a crank pin 26 upon which is mounted one end of a crank 27. The opposite end of the crank 27 is pivoted at the extremity of a rack-bar 28 slidably arranged in a guide recess 29 of a frame 30 secured underneath the shelf 3 at one side thereof.

Figures 4, 12:
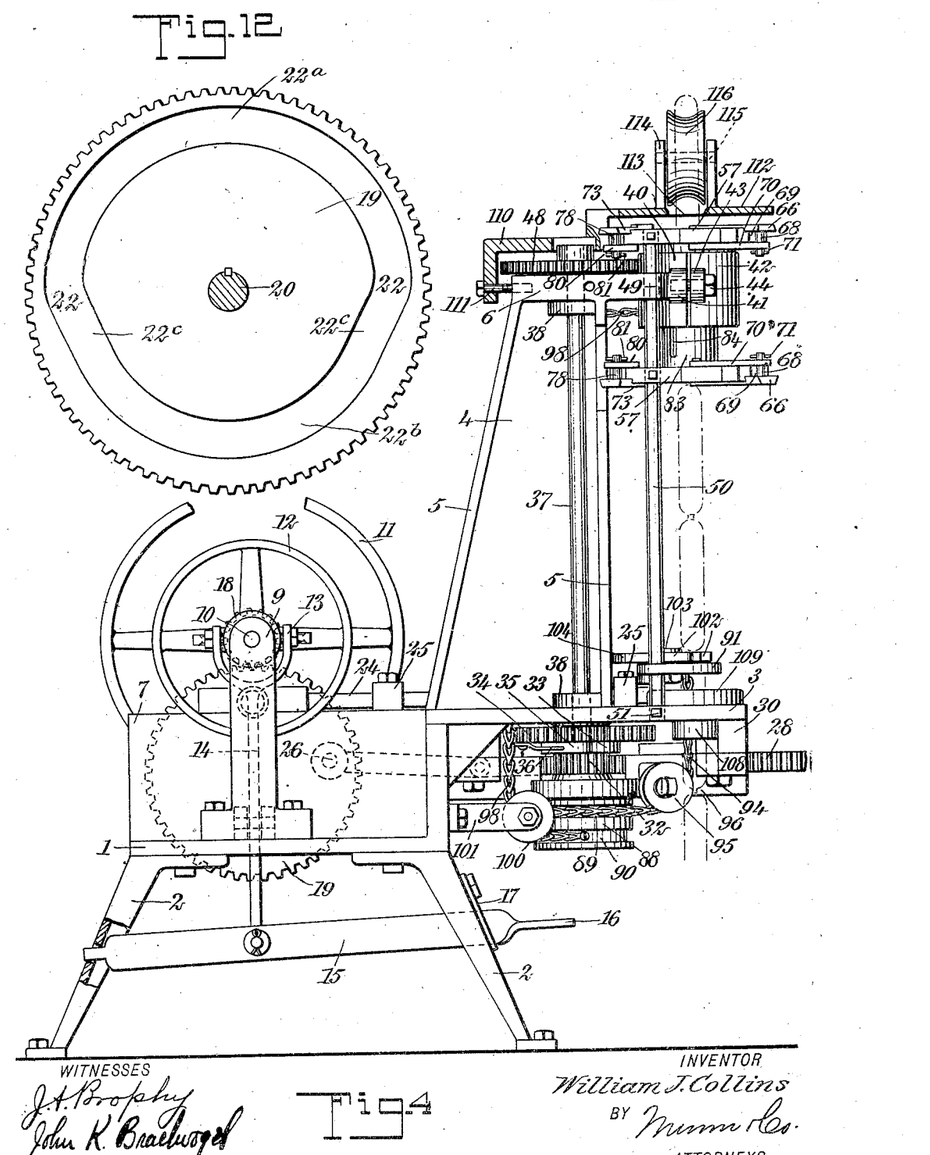
Fig. 4 is a substantially vertical, longitudinal section of the machine.
Fig. 12 is an enlarged side elevation of a cam gear wheel which controls the means for releasing the gripping and twisting mechanism.

A substantially vertical spindle 31 is journaled underneath the shelf 3 and carries a loose pinion 32 in mesh with the rack-bar 28. A ratchet wheel 33 is arranged upon the spindle 31 and is rigidly screwed or otherwise secured to the pinion 32. A gear wheel 34 is loosely mounted upon the spindle 31 and has a dog 35 pivoted thereupon by means of a screw or in any other convenient manner, and normally held in engagement with the ratchet by means of a spring 36 or any other suitable resilient member. The arrangement is such that when the rack-bar 28 is operated to turn the pinion 32 in one direction, the gear-wheel 34 is similarly driven through the dog 35 and the ratchet 33, a shoulder of which is then operatively engaged by the dog. A shaft 37 is arranged longitudinally of the upright and is journaled in suitable bearings 38 of the same (see Fig. 4). At the lower end, the shaft has a pinion 39 keyed or otherwise fastened thereupon and in mesh with the gear 34.

At the end projecting beyond the upright, the head 6 of the latter is formed into a semi-cylindrical member 40 which has at the opposite sides, ears 41. A correspondingly formed semi-cylindrical member 42 has ears 43 which can be secured by means of screws or bolts 44 to the ears 41. The members 40 and 42 form a cylindrical collar provided near the upper edge with an interior annular groove or recess 45. A cylinder, having formed at the outside thereof a peripheral gear 47, is arranged within the collar, with the gear 47 located in the groove 45. The gear 47 is in mesh with a gear 48 keyed or otherwise firmly secured at the upper end of the shaft 37. The member 40 has an extension 49 provided with an opening in which is arranged a guide rod 50. The latter has the lower end located in a suitable opening of the shelf 3, and is secured in the opening by means of set screws 51 or in any other convenient manner. The member 40 at the opposite side from the extension 49, has another extension 52 provided with an opening in which is movably arranged an operating rod 53, the lower end of which extends through a suitable opening of the shelf 3 and is provided with a collar 54. The operating rod has a longitudinal groove 55, which serves as a key-way for securing the collar in position. The latter has an extension 56 which engages in a suitable recess 56ª of the rod 24 and permits the actuation of the operating rod by means of the rod 24.

An annular fixed plate 57 is arranged at the upper edge of the collar formed by the members 40 and 42, and has extensions 58 provided with openings. The guide rod 50 is arranged in the openings of one of the extensions 58 and a similar guide rod 53 is mounted in the opening of the opposite extension 58. The rods are secured in position by means of set-screws 51 or in any other convenient manner. The under side of the plate 57 has an annular recess 59ª in which is arranged a movable ring 60. The latter is connected by means of a link 61, with a collar 62 rigidly mounted upon the releasing rod 53 by means of a key 63 engaging the groove 55. The collar has an arm 64 pivoted to the link 61 which is also pivoted to the ring 60. The plate 57 at opposite sides has extensions provided with radial dovetail grooves 65 in which are slidably mounted gripping members 66 suitably formed for the purpose, and at the adjacent ends having recessed heads 67 between which the sausage casing can be suitably held. The members 66 have pins 68 extending downwardly through openings 69 of the plate extensions. The pins 68 are connected by means of links 70 with the ring 60. The links 70 are pivoted to the pins 68 and the ring 60. Cotter pins 71 serve to hold the links 70 upon the pins 68.

The plate 57 at opposite sides, has further extensions with dovetail radial grooves 72, intermediate the grooves 65, and at substantially right angles thereto. Suitably formed blocks 73 are slidably arranged in the grooves 72, and have the inner ends formed into downwardly disposed fingers 74, adapted to engage the recesses 75 in twisting members 76. The latter are mounted to slide in radial grooves 77, formed in the upper rim of the cylinder 46, and are arranged underneath the gripping members 66. The twisting members 76 have the adjacent ends recessed or otherwise suitably formed to engage the sausage casing. The blocks 73 have pins 78, which extend downwardly through suitable openings 79 in the corresponding plate extensions. The pins 78 are connected by means of links 80 with the ring 60. The links 80 are pivotally held upon the pins 78 by means of cotter pins 81, and are likewise pivotally secured in any convenient manner to the ring 60. The cylinder 46 has the upper rim provided with a groove 82, annular in form and adapted to receive the fingers 74 of the blocks 73 so that the cylinder can rotate freely without interference by the blocks.

By partly rotating the ring 60 in one direction or the other, the gripping members and the blocks, and the twisting members, are moved longitudinally of their respective grooves, through the links 70 and 80. Consequently, when the rod 24 turns the operating rod 53 in one direction or the other, the latter through the link 61, actuates the gripping and twisting members.

The cylinder 83 is slidably arranged within the cylinder 46, and has a slot 84 arranged to receive a projection 85 of the cylinder 46 whereby it is adapted to rotate with the latter. At its lower edge, the cylinder 83 has a laterally extended flanged rim similar to the corresponding part of the cylinder 46. An inverted plate 57ª is arranged at the lower end of the cylinder 83, and has extensions 58 which receive the guides 50 and 59. The lower plate 57ª is similar in form to the upper plate 57, and like the latter has a movable ring 60 in an annular groove of the gripping members 66 and 67 respectively. It should be clearly understood that the lower portion of the gripping and twisting mechanism is exactly similar to the upper portion and is merely inverted so that the sausage casing is gripped and twisted at two separated points. The ring 60 of the upper plate is joined by a link 61 with a collar 62 secured by means of a key 63 upon the rod 53. The ring 60 of the lower plate is similarly connected by means of a link 61 with a collar 62 upon the releasing rod 53. The last-mentioned collar 62 has a set screw 86 which engages in the groove 55 and by means of it the collar 62 can be adjustably secured in position. As the lower member 66 is slidably and adjustably mounted upon the guides 37 and 59 and as the cylinder 83 is slidable within the cylinder 46, the distance separating the upper and lower gripping and twisting members can be adjusted for sausage links of different lengths.

The hub of the pinion 32 is extended to form a sleeve 87, located rotatably in a suitable opening of the frame 30 and projecting downwardly therethrough. At the projecting end, the sleeve 87 has keyed or otherwise rigidly mounted thereupon, a drum 88 having two peripheral annular grooves or recesses 89 and 90 respectively. An elongated plate 91 is slidably mounted upon the guide 50 and the operating rod 53 between the shaft 3 and the twisting mechanism, and is provided with suitable openings near the ends, for this purpose. Intermediate the ends, the plate 91 has an opening 92 therethrough which permits the passage of the sausages. At the under side, near the releasing rod 53, the plate 91 is provided with an eye bolt 93 from which depends a flexible member 94, consisting preferably, of a chain. The chain 94 passes over a grooved pulley 95 provided at the under side of the shelf 3 and mounted in position by means of a suitable bracket 96. The end of the flexible member 94 is secured in the groove 89 of the drum 88. At the upper side, the plate 91 has an eye bolt 97 to which is secured a flexible member, preferably a chain 98. The chain 98 passes upwardly over grooved pulleys 99 and 99$^a$ carried by the head 6 and the extension 52 of the upright respectively. After passing over the pulley 99, the chain 98 returns and passes downwardly through a suitable opening of the shelf 3 and passes around a grooved pulley 100 carried by a suitable bracket 101 at the under side of the shelf. The end of the chain 98 is secured in the groove 90 of the drum 88. By means of the chains 94 and 98 the plate 91 is moved up and down longitudinally of the guide 50 and the operating rod 53, as the drum is reciprocated through the corresponding back and forth movement of the rack-bar 28. The latter, it will be remembered, is driven from the gear wheel 19.

Arms 102 formed to seize and hold the sausage link, are pivoted together upon the plate 91 by means of a suitable pivot pin 103. The arms are arranged to extend over the opening 92 and have the ends remote from the latter, outwardly disposed and provided with projections 104, adapted to be engaged by the lobes of a cam 105, keyed or otherwise rigidly mounted upon the releasing rod 53, and movable longitudinally of the same, with the plate. The plate has a recess 106 in which is arranged a leaf spring 107 having an end secured to each of the arms 102. The spring 107 tends normally to force the arms 102 apart. The cam 105, when the operating rod is actuated in a predetermined manner, engages the extensions 104 of the arms and forces the latter toward each other to grip the sausage link, against the tension of the spring 107.

The shelf 3 has an opening therethrough in which is arranged a substantially vertical sleeve 108, having at the upper end a laterally disposed flange 109, which rests upon the shelf. The upper, inner edge of the sleeve is rounded. The opening of the sleeve 108 registers with the opening 92 of the plate 91 and with the bores of the cylinders 83 and 46, so that the sausage can pass downwardly through the cylinders, the opening 92 and the sleeve 108.

Figure 1:
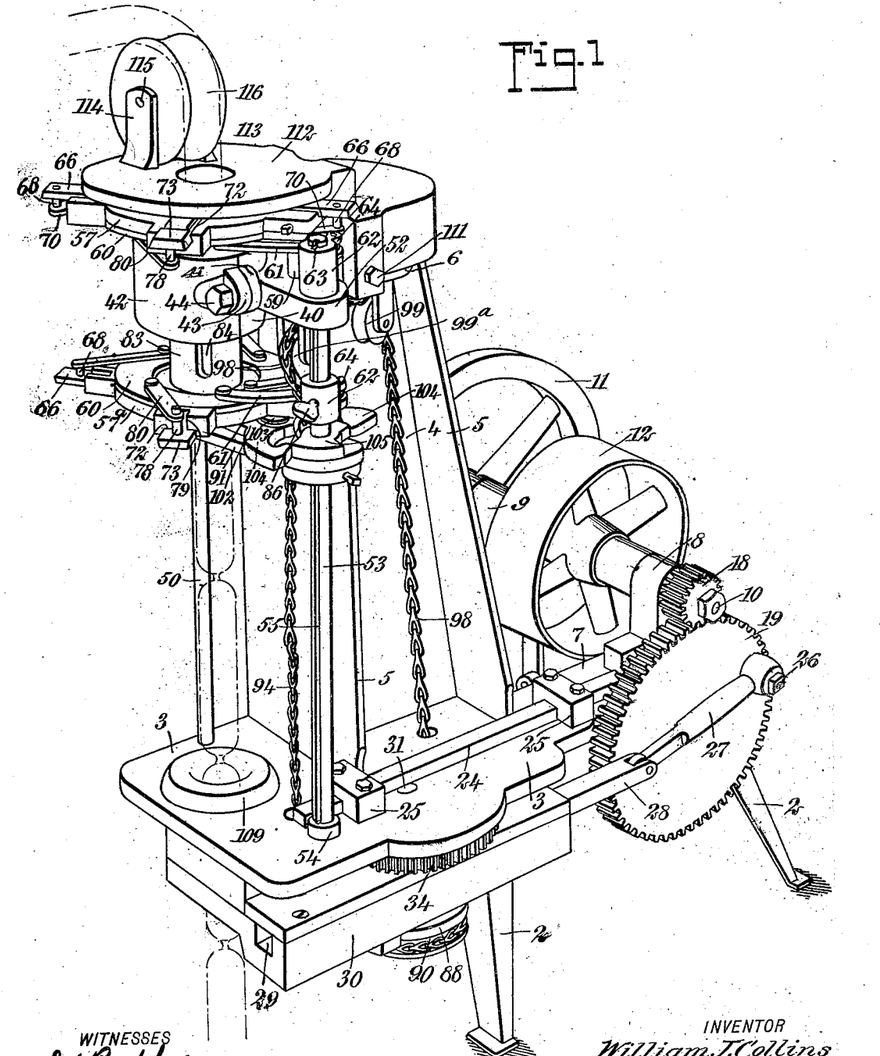
Figure 1 is a perspective view of my sausage twisting and linking machine.
Figure 2:
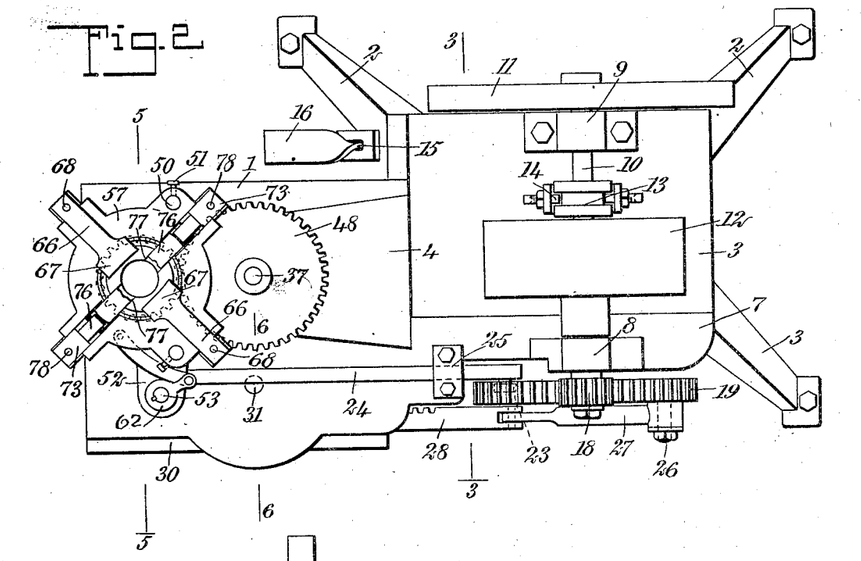
Fig. 2 is a plan view of the machine showing parts removed.
Figure 3:
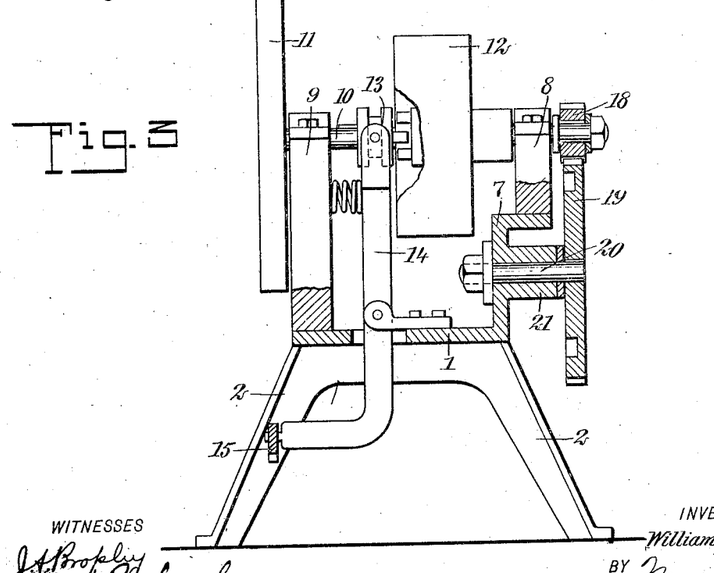
Fig. 3 is a transverse section on the line 3—3 of Fig. 2.
Figures 5, 13:
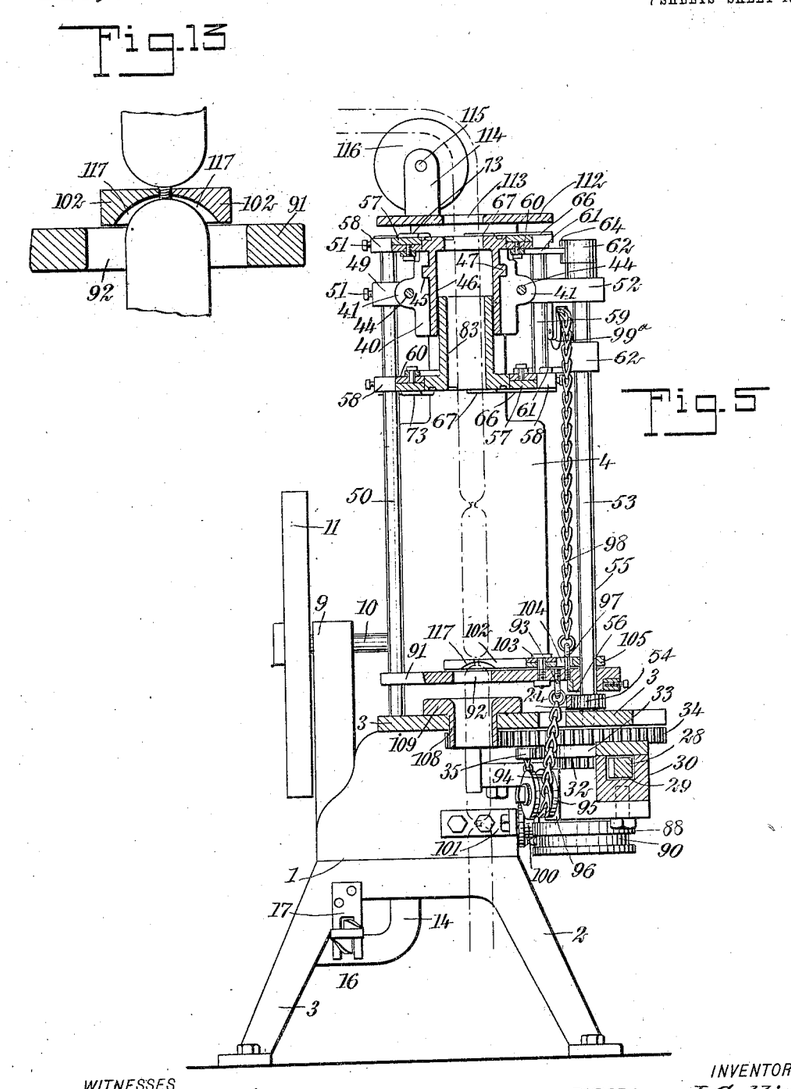
Fig. 5 is a substantially vertical, transverse section on the line 5—5 of Fig. 2, showing the gripping, twisting and advancing mechanism.
Fig. 13 is an enlarged transverse section showing a part of the advancing mechanism which engages the filled sausage casing.
Figure 6:
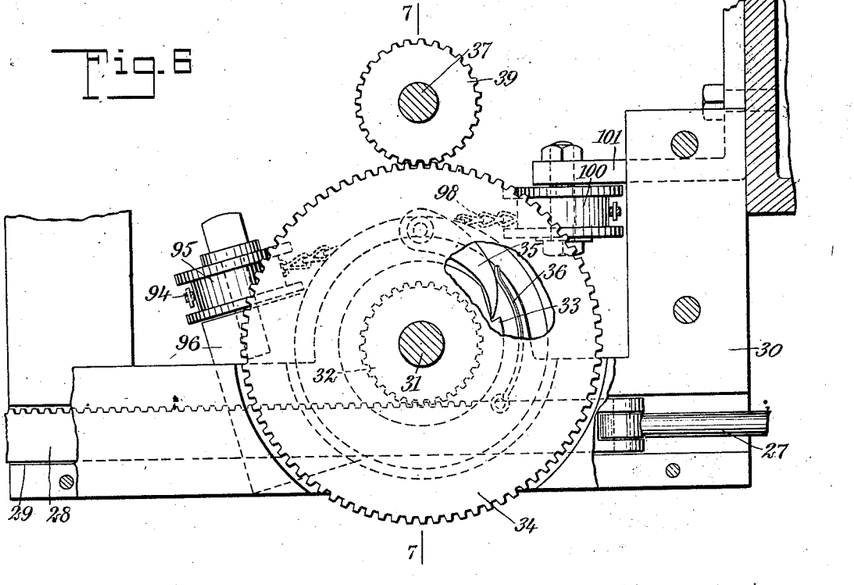
Fig. 6 is an enlarged inverted plan view of details having parts broken away and partly in section on the line 6—6 of Fig. 2, and showing means for operating the twisting mechanism.
Figure 7:
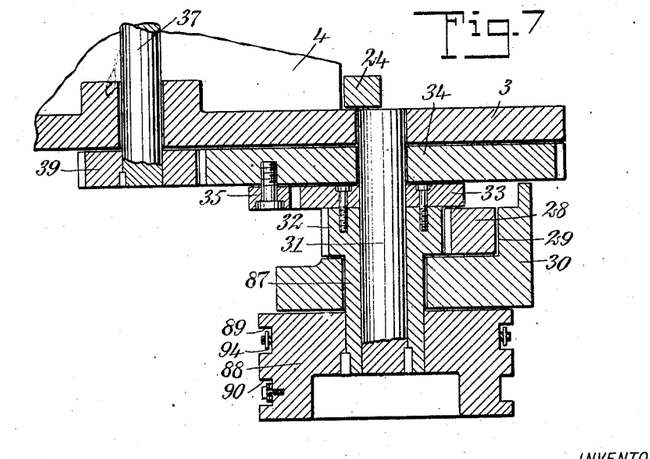
Fig. 7 is an enlarged transverse section on the line 7—7 of Fig. 6.
Figure 8:
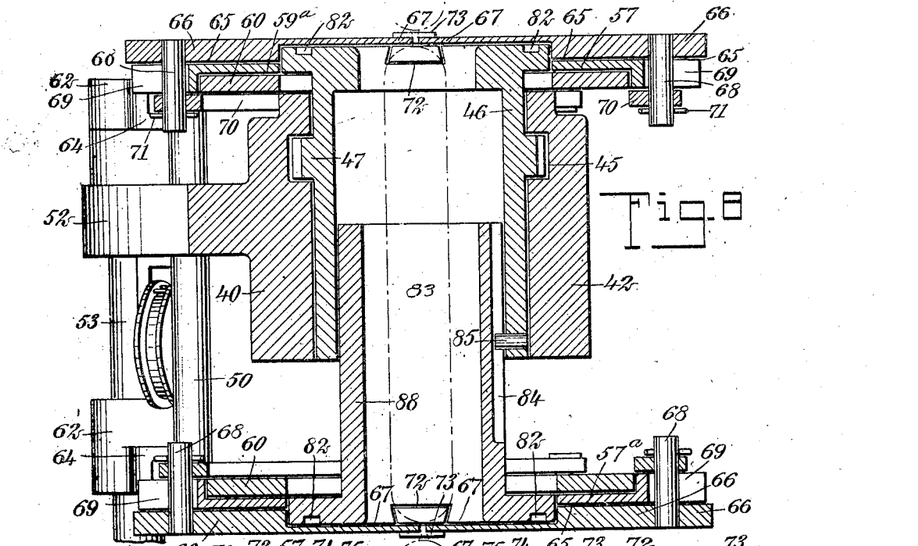
Fig. 8 is an enlarged longitudinal section on the line 8—8 of Fig. 11.
Figure 9:
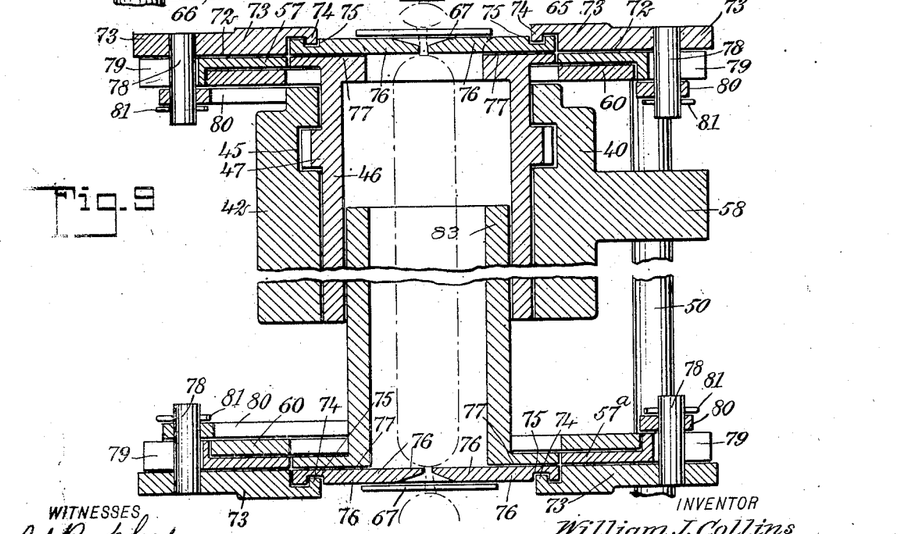
Fig. 9 is an enlarged longitudinal section on the line 9—9 of Fig. 11, showing parts broken away.
Figure 10:
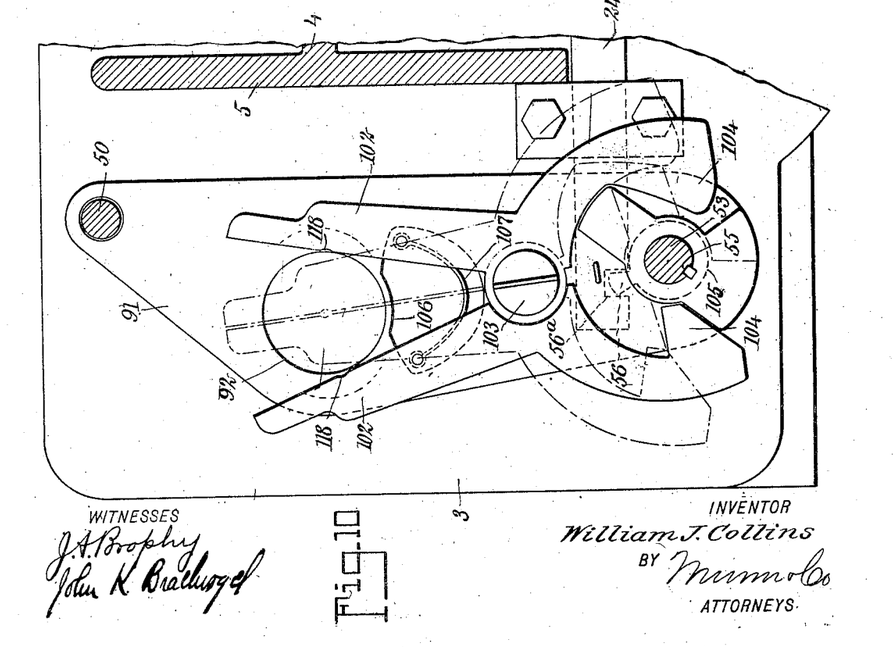
Fig. 10 is an enlarged plan view showing the advancing mechanism.
Figure 11:
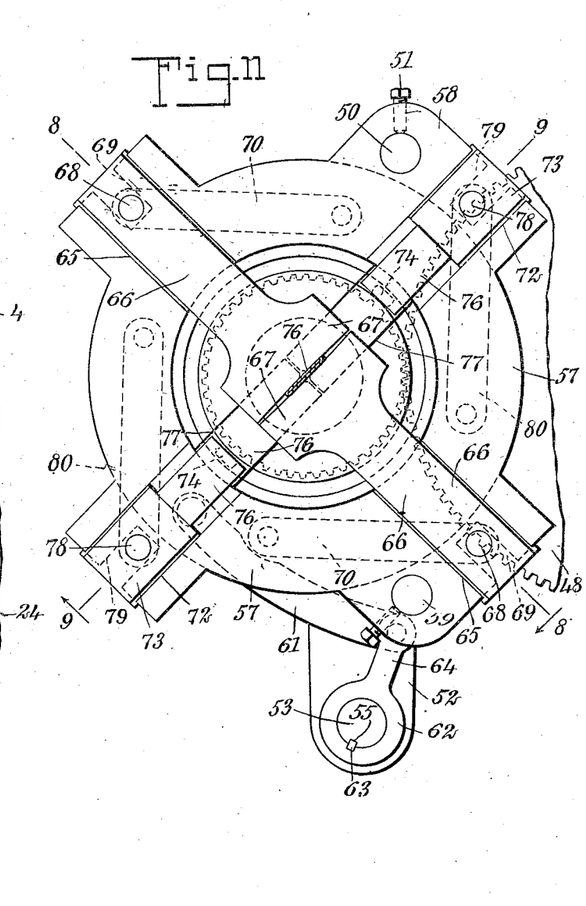
Fig. 11 is an enlarged plan view showing a portion of the gripping mechanism and a portion of the twisting mechanism.

A cover 110 is mounted upon the head of the upright 4, and is secured in position by means of screws or bolts 111. The cover 110 extends over the gear 48 and has an extension 112 which is upwardly offset and projects over the upper plate 57. It has a substantially central opening 113, and adjacent thereto, upwardly extending lugs 114 carrying therebetween a pivot pin 115. A grooved roller 116 is carried by the pin 115 and serves to direct the filled sausage casing to the opening 113. The sausage casing passes through the machine, as is indicated in dotted outline in Figs. 1, 4 and 5.

The arms 102 which seize the sausage links to advance the same through the machine, may be of any suitable form; preferably, each is provided with a concavity 117 at the under side, which permits the arms to grip at the intersection between two adjacent sausage links. If necessary, the arms at the adjacent sides, may have edge recesses 118 which permit the suitable engagement of the link intersections by the arms.

The filled sausage casing passes over the groved roller 116 and through the opening 113, to the cylinders 46 and 83. It passes through the latter, and at a certain stage of the operation of the machine the gripping arms 66 are moved toward each other and engage the casing, compressing and holding it at separated points. At the same time, the twisting arms 76 advance toward each other and likewise engage and firmly hold the casing. The gripping and twisting arms are rendered inoperative by the movement of the rings 60, which are rotated by the links 61 and the operating rod 53. The latter is actuated by the rod 24 which is engaged by the projection 56. The rod 24 is moved backward or forward as the case may be, by means of rotation of the gear 19 with the cam groove 22. The latter comprises oppositely located curved sections 22$^a$ and 22$^b$, each of which is concentric with the gear wheel 19, and which are of different radius. The sections 22$^a$ and 22$^b$ are joined by further substantially straight groove sections 22$^c$. It will be understood that as long as the stud 23 is in engagement with the groove section 22$^a$ or the section 22$^b$, the rod is not moved longitudinally; but when the groove sections 22$^c$ displace the rod in the direction of its length and thus actuate the operating rod 53, thereby actuating the gripping and twisting members.

As long as the casing is held by the gripping and twisting members, the cylinders 46 and 83 are rotated by the gear wheel 48, which is in mesh with the teeth of the gear 47 upon the cylinder 46. During this rotation, the twisting members are located in the grooves 77 of the cylinders 46 and 83 and are carried around with the same to twist the casing. The fingers 74 are inoperatively received by the grooves 82 and thus the cylinders can rotate freely. In this way the section of the sausage casing intermediate the gripped points is rapidly rotated and twisted to form a link. The gear wheel 48 is driven by the shaft 37, which, in turn is actuated by the pinion 39 and the gear wheel 34. The latter is driven through the engagement of the dog 35 with the ratchet 33, the latter being rigid with the pinion 32, which is operated by the rack-bar 28. The latter has a crank connection with the gear wheel 19, and owing to the interposition of the dog and ratchet between the pinion 32 and the gear wheel 34, the twisting action is effected only, when the rack-bar 28 is moving backward, that is, toward the gear wheel 19. During the return movement of the rack bar 28 the dog slips inoperatively along the rim of the ratchet, so that the gear wheel 34 is not operated, in turn to operate the shaft 37.

As the drum 88 is keyed or otherwise rigidly secured to the pinion 32 it is reciprocated in accordance with the backward and forward movements of the rack bar 28. As the rack bar is moving backward, the drum is rotated in a direction which, through the chain 98 serves to advance the plate 91 upward along the guide 50 and the operating rod 53. While the link is being twisted, the advancing means are approaching the twisting means. When the operation has progressed to a certain point, the operating rod is actuated by the rod 24 and the cam groove, and releases the gripping and twisting members. As the rotation of the cylinders ceases, the fingers 74 engage the recesses 75 of the twisting members and the latter are separated as the blocks 73 are moved outwardly. The same movement of the operating rod 53 actuates the cam 105 so that the spring 107 approaches the advancing arm 102, which seize the sausage casing. The rack bar 28 now begins its forward movement and the drum 88 is then rotated in the opposite direction and thus, through the chain 94 moves the plate 91 downward along the guide and the operating rod. As the arms 102 have gripped the casing, however, the sausage is drawn through the machine as the plate 91 moves downward. It will be understood that, owing to the inoperative engagement of the dog 35 with the ratchet 33 when the latter is turned in one direction, the twisting mechanism is inoperative and permits the sausage to be drawn freely therethrough. When the plate 91 reaches a predetermined point, the rack-bar has completed its forward movement and begins to return. At this time the cam groove again actuates the rod 24 to turn the operating rod 53 so that the gripping and twisting members are rendered operative and so that the advancing arms 102 are released. The next section of the filled casing is now twisted while the plate 91 is again advancing upward toward the twisting mechanism.

Briefly stated, the operation of my machine is as follows: While the twisting mechanism is rotating a section of the filled casing to form a link, the advancing mechanism is approaching the twisting mechanism, and, as soon as the twisting action ceases, the advancing mechanism seizes the casing and returns, drawing the filled casing with it through the twisting mechanism, which meanwhile, is inoperative. When a sufficient length of the filled casing has been drawn through the machine, the advancing mechanism is released and the twisting mechanism becomes operative to form the succeeding section into a link, the advancing mechanism meanwhile again approaching the twisting mechanism, to assume a position such that it can seize the casing, further to advance the same as soon as the twisting action ceases.

In forming the links, the filled casing is twisted at two separate points, the distance between which corresponds to the length of the link. The advancing mechanism draws the casing through the machine for a length corresponding to two link lengths, so that three links are formed by two twisting operations.

Having thus described my invention, I claim as new and desire to secure by Letters Patent:—

1. In combination, a pair of grips for holding a filled casing, a second pair of grips spaced apart and adapted to hold the filled casing, each grip of each said pairs being adapted to engage the casing independently of the other grip, said second pair being intermediate said grips of said first pair, and means for rotating one of said pairs to twist the casing.

2. In combination, grips for holding a filled casing at separated points, means for gripping the casing at separated points intermediate the first points, and means for operating said means whereby the casing intermediate the first points is twisted.

3. In combination, means for advancing a filled casing intermittently, grips for holding the casing at separated points, further means for gripping the casing at separated points intermediate the first separated points, means for operating said further gripping means whereby the casing is twisted intermediate the first separated points, and means for rendering both said grips and said further gripping means operative, and for releasing them, said advancing means being inoperative when both said gripping means are operative.

4. In combination, means for forming a filled casing into links, and advancing means, said advancing means being movable toward and away from said first means, and said advancing means having relatively movable arms for gripping the casing and holding the same while moving away from said first means.

5. In combination, intermittently operable means for forming a filled casing into links, advancing means movable toward and away from said first means, and means for simultaneously operating said first means and said advancing means, whereby said first means are inoperative while said advancing means are moving away from said first means, said advancing means including arms for gripping the casing, said gripping arms of said advancing means being inoperative when said advancing means are moving toward said first means.

6. In combination, means for forming a filled casing into links, advancing means movable toward and away from said first means and including separable arms for seizing and holding the casing, and means for controlling said first means and said advancing means, whereby said first means are operative while said advancing means are moving away from said first means, and whereby said arms of said advancing means are inoperative while said advancing means are moving toward said first means.

7. In combination, grips for engaging a filled casing at separated points, said means being adjustable toward and away from one another, means for twisting the casing intermediate the separated points, and means for advancing the casing.

8. In combination, means for gripping a filled casing, means for twisting the casing at a point adjacent to the gripped point, further means separated from said first means for gripping the casing, other means for twisting the casing at a point adjacent to the point gripped by said further means, said first gripping and said first twisting means and said further gripping means and said other twisting means, being adjustable with respect to one another, whereby the length of the link formed therebetween can be varied, and means for intermittently advancing the casing.

9. In combination, intermittently operable means for gripping a filled casing at separated points, intermittently operable means for twisting the casing at points adjacent respectively to the gripped points, intermittently operable means for advancing the casing, and means for simultaneously operating said other means whereby said advancing means are inoperative while said twisting means and said gripping means are operative, and whereby said advancing means are operative while said gripping means and said twisting means are inoperative, said gripping and said twisting means being adjustable with respect to one another, whereby links of varying lengths can be formed.

10. In combination, means for intermittently advancing a filled casing, grips for engaging the casing and for holding the same fixed, grips for engaging the casing at a point adjacent to the first engaged point and for twisting the same, and means for simultaneously operating said other means and said grips.

11. In combination, members for gripping a sausage casing and arranged to be moved toward and away from each other, members for twisting the casing and arranged to be moved toward and away from each other, said twisting members being movable independently of said gripping members, each of said twisting members being adjacent to one of said gripping members, said twisting members being spaced apart, means for intermittently operating said members, means for operating said twisting members independently of said gripping members, and means for intermittently advancing the casing.

12. In combination, casing-gripping members movable toward and away from each other, casing-twisting members movable toward and away from each other, said twisting members when in a predetermined position being rotatable, whereby the casing can be twisted, means for simultaneously rendering said members operative, means for intermittently rotating said twisting members, and means for intermittently advancing the casing.

13. In combination, casing-gripping members movable toward and away from each other, casing-twisting members movable toward and away from each other, means for simultaneously operating said members, said twisting members in a predetermined position being free to rotate, means for intermittently rotating said twisting members, means for rendering said gripping members and said twisting members operative and inoperative, and means for controlling said last-mentioned means whereby the same are operated before and after the operation of said means for rotating said twisting members.

14. In combination, holding members movable toward and away from each other and serving to grip a casing, twisting members movable toward and away from each other and serving to grip the casing adjacent to said holding members, means for simultaneously moving all said members, said twisting members when approached, being free to rotate, means for intermittently rotating said twisting members, means for approaching all said members prior to the rotation of said twisting members, means for separating said holding members after the rotation of said twisting members, and means for intermittently advancing the casing, said advancing means being inoperative while said twisting members are being rotated.

15. In combination, a plate having grooves, members movable in said grooves and arranged to be approached and separated, said members serving to grip a sausage casing at adjacent points, a hollow member arranged centrally with respect to said plate and arranged to permit the sausage casing to pass therethrough, said hollow member being rotatable, certain of said members when approached, engaging said hollow member and being free to rotate therewith, means for separating and approaching said members, and means for rotating said hollow member.

16. In combination, a hollow member arranged to permit a sausage casing to pass therethrough, a plate having an opening to permit the casing to pass therethrough into said hollow member and provided with grooves, gripping members movably arranged in certain of said grooves and adapted to be separated and approached, said gripping members when approached, serving to hold the sausage casing, further members arranged in certain of said grooves and movable into engagement with said hollow member, said further members being adapted to grip the sausage casing when approached, means for simultaneously separating and approaching said gripping members and said further members, said hollow member being rotatable, means for intermittently rotating said hollow member when said further members are in engagement therewith, and means for intermittently advancing the sausage casing through said hollow member.

17. In combination, a cylinder having radial grooves in a rim thereof, a plate having a central opening and arranged at the grooved rim of said cylinder, said plate having radial grooves, gripping members and blocks slidably arranged in said grooves of said plate, twisting members slidably arranged adjacent to said blocks and movable into said grooves of said cylinder, a movable member controlling said gripping members and said blocks, said blocks being formed to engage said twisting members to control the same, said cylinder being formed to engage said blocks in a manner such that said cylinder is free to rotate, means for operating said movable member to approach said gripping members and said twisting members and to separate the same, means for rotating said cylinder when said gripping members and said twisting members are approached, and means for intermittently advancing a sausage casing through said cylinder.

18. In combination, means for forming a filled casing into links, advancing means movable toward and away from said first means, means for intermittently operating said first means, and means controlled by said operating means for moving said advancing means toward and away from said first means, said advancing means including separable arms for seizing and holding the casing, said arms being inoperative while said advancing means are moving toward said first means, and operative while said advancing means are moving away from said first means.

19. In combination, means for forming a filled casing into links, means for intermittently driving said first means, a member movable toward and away from said first means, means controlled by said driving means for moving said member toward and away from said first means, and arms carried by said member for seizing and holding the casing, said arms being operative while said first means are inoperative.

20. In combination, rotatable sausage casing-twisting means, a continuously movable driving member, a reciprocable member controlled by said driving member, means for connecting said reciprocable member and said twisting means whereby said twisting means are operated when said reciprocable member is moving in one direction only, an advancing member movable toward and away from said twisting means, means controlled by said reciprocable member for operating said advancing member, and means on said advancing member for seizing the casing, said last-mentioned means being inoperative while said advancing member is moving away from said twisting means.

21. In combination, rotatable sausage casing-twisting means, a rotatable driving member, a reciprocable member controlled by said driving member, means for operatively connecting said reciprocable member and said twisting means, whereby the latter are rotated when said reciprocable member is moving in one direction, an advancing member movable toward and away from said twisting means, said advancing member being operable through the movement of said reciprocable member, said advancing member being controlled by said reciprocable member so that it moves toward said twisting means when the latter are inoperative, means carried on said advancing member for seizing and holding the casing, and means for operating said last-mentioned means, whereby the latter are inoperative when said advancing member is moving toward said twisting means.

22. In combination, means for forming a filled sausage casing into links, a rotatable driving member, a reciprocable member controlled by said driving member, a rotatable member controlled by said reciprocable member and movable in opposite directions thereby, advancing means movable toward and away from said first means and having means for seizing and holding the casing, and means for operatively connecting said advancing means and said rotatable member, said advancing means being operative while moving away from said first means.

23. In combination, means for forming a filled sausage casing into links, a driving wheel, a reciprocable rack-bar having a crank connection with said driving wheel, a pinion in mesh with said rack-bar and having a drum, means for operatively connecting said pinion and said first means, whereby said first means are intermittently operated, a member movable toward and away from said first means and having means for seizing and holding the casing, said last mentioned means being operative while said member is moving away from said first means, and flexible members secured to said member and said drum and adapted to be wound about the latter in opposite directions.

24. In combination, means for forming a filled sausage casing into links, a member movable toward and away from said first means and including means for seizing and holding the casing, an operating member controlling said first means and said last-mentioned means and having mechanism for simultaneously rendering said first means inoperative and said last-mentioned means operative, and means controlled by said driving member for operating said operating member at predetermined intervals.

25. In combination, means for forming a filled sausage casing into links, a rotatable driving member, an advancing member movable toward and away from said first means and controlled by said driving member, a reciprocable rod controlled by said driving member, means for operatively connecting said rod and said first means, whereby said rod serves to render said first means operative and inoperative, said advancing member having means for seizing the casing, means for operatively connecting said rod and said last-mentioned means, whereby said rod serves to render said last-mentioned means operative and inoperative, and means controlled by said driving member for moving said advancing member toward and away from said first means.

26. In combination, a rotatable driving member having a cam formed thereon, means for gripping a sausage casing, means for twisting the casing, means for intermittently operating said twisting means by the movement of said member, reciprocable mechanism controlled by said cam for simultaneously rendering said gripping and said twisting means operative and inoperative alternately, and means controlled by said member for intermittently advancing the casing, said last mentioned means including means for seizing the casing, said casing-seizing means being controlled by said mechanism so that said casing-seizing means is operative while said advancing means are operative.

In testimony whereof I have signed my name to this specification in the presence of two subscribing witnesses.

WILLIAM JOSEPH COLLINS.

Witnesses:
WALTER V. BOYCE,
PETER F. BRADY.